United States Patent [19]

Nyquist

[11] Patent Number: 4,642,035
[45] Date of Patent: Feb. 10, 1987

[54] CROSS LOOP ATTENUATOR FOR HYDRAULIC SYSTEMS

[75] Inventor: Gary A. Nyquist, Dubuque, Iowa

[73] Assignee: Deere & Company, Moline, Ill.

[21] Appl. No.: 572,793

[22] Filed: Jan. 23, 1984

[51] Int. Cl.$^4$ ............................................. F04B 11/00
[52] U.S. Cl. .................................... 417/312; 417/542; 138/26
[58] Field of Search .................... 60/469, 338; 138/26, 138/30; 417/312, 540, 542; 137/593

[56] References Cited

U.S. PATENT DOCUMENTS

| | | | |
|---|---|---|---|
| 2,258,469 | 10/1941 | Podolsky | 138/26 |
| 3,061,039 | 10/1962 | Peters | 138/26 |
| 3,134,611 | 5/1964 | Iversen | 60/469 |
| 3,532,124 | 10/1970 | Lowery | 138/26 |
| 3,660,979 | 5/1972 | Kamakura et al. | 60/52 |
| 3,916,948 | 11/1975 | Benjamin | 137/559 |

FOREIGN PATENT DOCUMENTS 1576620 10/1980 United Kingdom .................. 138/26

OTHER PUBLICATIONS

J. S. Noss, "Can You Hear the Hydraulic System?", 9/17/70, pp. 143 and 144.

Primary Examiner—Robert E. Garrett

[57] ABSTRACT

A vehicle hydraulic fluid system includes an engine driven pump which excites the fluid in the system downstream of the pump by imparting pressure pulses thereto at frequencies which vary as the speed of the engine, and hence, the pump varies. For the purpose of inhibiting the transmission of these pulses through the system and thereby lessening noise caused by the radiation of the pulses by components in the system, a cross loop attenuator is coupled in the system adjacent the pump outlet. The attenuator comprises a simple hose or tube having its opposite ends coupled to opposite sides of a cross fitting having its other two sides coupled in a line leading from the pump outlet.

5 Claims, 1 Drawing Figure

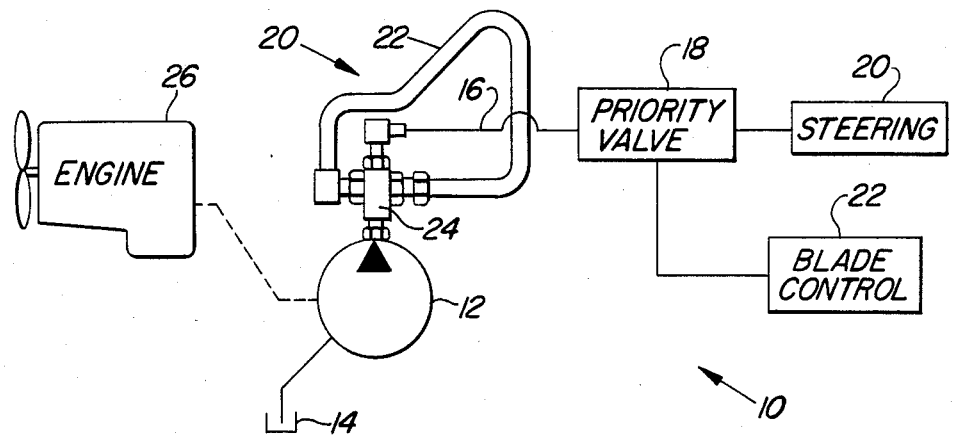

CROSS LOOP ATTENUATOR FOR HYDRAULIC SYSTEMS

BACKGROUND OF THE INVENTION

The present invention relates to hydraulic systems and more particularly relates to devices for controlling hydraulic system noise.

Hydraulic oil under pressure is a common means of generating power to move objects or overcome opposing forces. In mobile equipment, a pump is normally the source of pressurized oil. Positive displacement pumps, such as axial or radial piston pumps, or gear pumps combine the flow of individual pumping chambers to produce their total flow. During operation, the pumping chambers each contract and compress discrete volumes of fluid into the system against system pressure. After delivery of the pressurized fluid, the pumping chambers expand and are refilled with low pressure oil from an oil supply port. Variations in flow due to the contraction and expansion of the pumping chambers excites the fluid in the system resulting in pump flow fluctuations or ripples and system pressure fluctuations or ripples. The system pressure fluctuation excites responsive mechanical members causing them to radiate sound.

Heretofore, it has been known to couple various devices, such as accumulators, expansion chambers and Quincke tubes, in hydraulic systems for the purpose of controlling hydraulic system noise. Of these devices, the Quincke tube bears the most physical resemblance to the present invention and therefore will be described in more detail.

In one type of Quincke tube arrangement, the pump output is split to follow first and second branches which are reunited. The branches differ in length by a distance equal to one-half the length of a sound wave induced in the system fluid by the pump. Since the waves traveling through the two branches are out of phase by half a wave length, the waves will cancel where the branches come together and no wave will travel through the system to excite components and cause them to radiate sound. However, the wave length is dependent upon its frequency and the frequency is a function of the pump speed, which in most installations varies with the vehicle engine speed. Therefore, the pump will often be operating at frequencies for which the split Quincke tube arrangement is ineffective.

Now, there is provided a silencer tube arrangement which has the simplicity of the split Quincke tube arrangement but is superior thereto since it is effective over a broad range of sound wave frequencies.

SUMMARY OF THE INVENTION

According to the present invention there is provided a novel attenuator for reducing the transmission of noise inducing sound waves through the fluid used in a vehicle hydraulic system.

A broad object of the invention is to provide an attenuator of a simple construction having no moving parts and having the ability to attenuate a large range of frequencies of fluid borne sound waves traveling in a vehicle hydraulic fluid system.

A more specific object of the invention is to couple a looped tube or hose to a hydraulic fluid conduit coupled to a pump outlet such that opposite ends of the tube or hose are directly opposite each other.

These and other objects, features and advantages of the present invention will become apparent to those skilled in the art from the description which follows and from the drawing.

BRIEF DESCRIPTION OF THE DRAWING

The sole FIGURE is a partial schematic representation of a hydraulic system embodying an attenuator constructed in accordance with the principles of the present invention.

DESCRIPTION OF THE PREFERRED EMBODIMENT

Referring now to the drawing, there is shown a typical vehicle hydraulic system 10 including a pump 12 having an inlet coupled to a reservoir 14 and having an outlet coupled to a line 16. The line 16 is coupled to a priority valve 18 connected to a priority function indicated at 20 and a non-priority function noted at 22.

Connected to the line 16 adjacent the pump 12 is an attenuator 20 in the form of a looped hose or conduit 22 having opposite ends coupled to the line 16 at diametrically opposite, line of sight communicating locations. Specifically, a cross fitting 24 is located in the line 16 with upstream and downstream sections of the line 16 being coupled to a first set of aligned connection points of the fitting and with the attenuator 20 having its opposite ends coupled to a second set of aligned connection points.

The pump 12 is coupled for being driven at various speeds by a variable speed engine 26 and may be of any common construction including a plurality of expansible and contractable chambers which act to force discrete volumes of fluid into the line 16 and, hence, act to create a pressure pulse or ripple to be induced in the fluid contained in the line 16.

In the absence of the attenuator 20, the pressure pulse or ripple created by the pump 12 would be received and radiated as noise by the various hydraulic components forming part of the system 10. However, the attenuator 20 serves as an expansible chamber or volume expansion device that reduces noise energy transmission through the hydraulic system by reflecting that energy back toward the source of the energy. Thus, the attenuator 20 is effective throughout the entire range of energy pulse frequencies.

Having described the preferred embodiment, it will be apparent that modifications can be made without departing from the scope of the invention as defined in the accompanying claims.

I claim:

1. In combination with a vehicle hydraulic system including an engine driven pump having a plurality of individual expansible and contractable pumping chambers coupled for delivering fluid to a system pressure conveying line, a reactive attenuator, comprising: a conduit formed into a loop and having its opposite ends coupled directly to opposite sides of said line and being in free fluid communication with the line and each other.

2. The combination defined in claim 1 wherein said line has a cross fitting located therein with the opposite ends of said conduit being coupled to opposite sides of said fitting.

3. The combination defined in claim 1 wherein said conduit is a metal tube.

4. The combination defined in claim 1 wherein said conduit is a flexible hose.

5. In a hydraulic fluid system including a pulsating source of pressurized fluid coupled to a line for transmitting fluid to at least one hydraulically operable work device and an attenuator coupled to the line adjacent said pulsating source for reducing the transmission of sound waves from said source, an improved attenuator, comprising: a length of conduit having opposite ends coupled to said line at diametrically opposed locations and being in free liquid communication with said line and each other whereby the conduit acts as a volume expansion chamber which performs as a reactive attenuator resulting in a reflection of at least a portion of the pressure pulse of the source back toward the source and a reduction of the pressure pulse energy transmitted downstream to thereby lessen noise radiation from said device.

* * * * *